US011377389B2

(12) United States Patent
Laguatan et al.

(10) Patent No.: US 11,377,389 B2
(45) Date of Patent: Jul. 5, 2022

(54) BEAD MAKER AND DECORATOR

(71) Applicant: Crayola LLC, Easton, PA (US)

(72) Inventors: Roseld V. Laguatan, Bath, PA (US); Keith Allison, Blandon, PA (US)

(73) Assignee: Crayola LLC, Easton, PA (US)

( * ) Notice: Subject to any disclaimer, the term of this patent is extended or adjusted under 35 U.S.C. 154(b) by 101 days.

(21) Appl. No.: 16/859,316

(22) Filed: Apr. 27, 2020

(65) Prior Publication Data

US 2020/0255336 A1    Aug. 13, 2020

Related U.S. Application Data

(62) Division of application No. 15/341,853, filed on Nov. 2, 2016, now Pat. No. 10,669,206.

(60) Provisional application No. 62/252,169, filed on Nov. 6, 2015.

(51) Int. Cl.

| | | |
|---|---|---|
| C04B 33/14 | (2006.01) | |
| B44C 5/00 | (2006.01) | |
| B44C 3/04 | (2006.01) | |
| A44C 27/00 | (2006.01) | |
| C09D 7/65 | (2018.01) | |
| B29D 1/00 | (2006.01) | |
| A44C 11/00 | (2006.01) | |
| C09J 133/04 | (2006.01) | |
| B29D 22/04 | (2006.01) | |
| B05D 1/18 | (2006.01) | |
| C09D 5/02 | (2006.01) | |
| C09D 133/00 | (2006.01) | |

(52) U.S. Cl.
CPC ............ *C04B 33/14* (2013.01); *A44C 11/002* (2013.01); *A44C 27/00* (2013.01); *B05D 1/18* (2013.01); *B29D 1/00* (2013.01); *B29D 22/04* (2013.01); *B44C 3/048* (2013.01); *B44C 5/00* (2013.01); *C09D 5/022* (2013.01); *C09D 5/027* (2013.01); *C09D 5/028* (2013.01); *C09D 7/65* (2018.01); *C09D 133/00* (2013.01); *C09J 133/04* (2013.01)

(58) Field of Classification Search
CPC ........ C04B 33/14; C09D 5/022; C09D 5/027; C09D 5/028; C09D 7/65; C09D 133/00; C09D 133/04; A44C 11/002; A44C 27/00; B05D 1/18; B29D 1/00; B29D 22/04; B44C 3/048; B44C 5/00
See application file for complete search history.

(56) References Cited

U.S. PATENT DOCUMENTS

| | | | |
|---|---|---|---|
| 4,376,654 A | 3/1983 | Zola | |
| 4,388,350 A | 6/1983 | Ayers | |
| 5,348,766 A | 9/1994 | Latham | |
| 5,639,513 A | 6/1997 | Latham | |
| D678,001 S | 3/2013 | Cucci | |
| D691,427 S | 10/2013 | Cucci | |
| D691,428 S | 10/2013 | Cucci | |
| D691,429 S | 10/2013 | Cucci | |
| D691,430 S | 10/2013 | Cucci | |
| D691,431 S | 10/2013 | Cucci | |
| 8,852,484 B2 | 10/2014 | Castle et al. | |
| 2004/0212117 A1 | 10/2004 | Lee | |
| 2013/0193615 A1 | 8/2013 | Weikel et al. | |

FOREIGN PATENT DOCUMENTS

| | | |
|---|---|---|
| EP | 1533346 A1 | 5/2005 |
| WO | 9523197 A2 | 8/1995 |

OTHER PUBLICATIONS

Australian Examination Report for Australian Application No. 2016349360, dated Nov. 3, 2020, 3 pages.
"Sculpey Bead Maker" by PolyformProducts, published Apr. 30, 2014, accessed on Jun. 5, 2019, https://wwww.youtube.com/watch?v=e1aUDTEIUXo (Year: 2014), 4 pages.
Final Office Action for U.S. Appl. No. 15/341,650, dated Jun. 12, 2019, 22 pages.
International Preliminary Report on Patentability and Written Opinion for International Application No. PCT/US2016/060322, dated May 8, 2018, 8 pages.
International Search Report and Written Opinion for International Application No. PCT/US2016/060322, dated Mar. 15, 2017, 14 pages.
Non Final Office Action for U.S. Appl. No. 15/341,650, dated Jan. 15, 2019, 11 pages.
Non Final Office Action for U.S. Appl. No. 15/341,650, dated Nov. 8, 2019, 25 pages.
Provokejewellery: "Marbled Beads," Youtube, Jan. 31, 2009, XP054977199, retrieved from the internet: https://www.youtube.com/watch?v=6yLR03jXCPE, retrieved on Mar. 7, 2017, 1 page.
Sculpey, "Sculpey Bead Maker", downloaded at https://www.sculpey.com/beading/56-sculpey-bead-maker, 2019, 6 pages.

(Continued)

*Primary Examiner* — Edward J Cain
(74) *Attorney, Agent, or Firm* — RatnerPrestia

(57) ABSTRACT

An apparatus, kit, and methods for forming a bead between bead-forming blocks having internal bead-forming channels are provided. The bead-forming channels of adjacent bead-forming blocks are slidably engaged to manipulate a measured amount of modeling compound between the bead-forming blocks and within an internal space between the opposing channels. In one embodiment, the bead-forming blocks maintain orientation with respect to an axis of travel based on a block guide. Further, the measured amount of modeling compound is determined using an integrated measuring feature coupled to at least one of the pair of bead-forming blocks. The internal volume of an integrated measuring feature corresponds to a threshold amount of modeling compound for manipulating between the pair of blocks and forming a bead while contacting at least a portion of the mated bead-forming channels. In further aspects, a molded bead may be coated with a multicomponent bead-coating mixture. Multi-component bead-coating mixtures and methods of using thereof are provided.

5 Claims, 7 Drawing Sheets

(56) References Cited

OTHER PUBLICATIONS

TheToyReviewer: "Crayola Creations Marbling It! Marble Jewelry Kit Unboxing Toy Review by TheToyReviewer," Youtube, Jun. 6, 2016, XP54977194, retrieved from the internet, https://www.youtube.com/watch?v=1xMgnnBmGNk, retrieved on Mar. 6, 2017, 3 pages.
Entire patent prosecution history of U.S. Appl. No. 15/341,853, filed Nov. 2, 2016, entitled, "Bead Maker and Decorator."

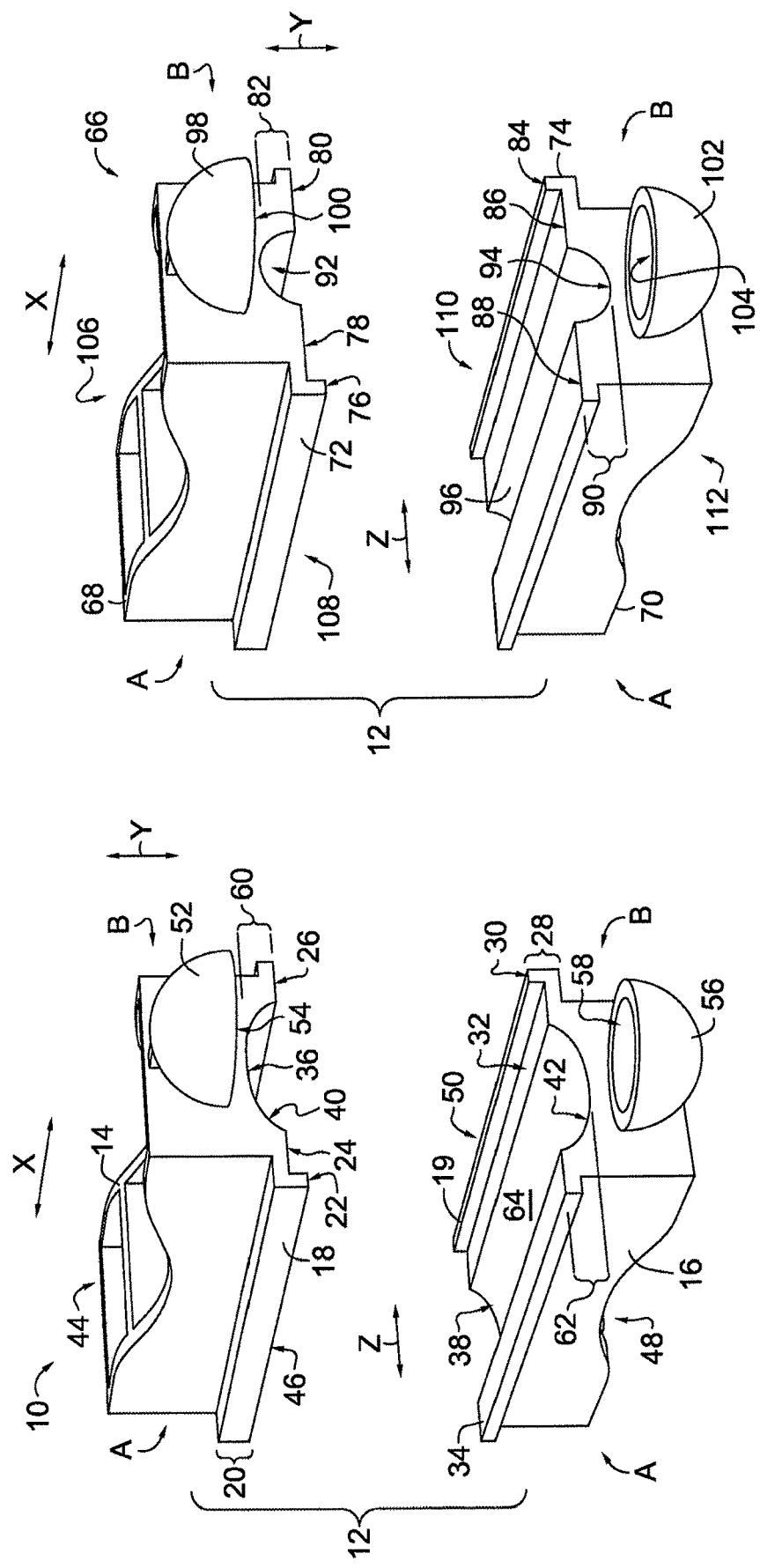

BEAD MAKER AND DECORATOR

CROSS-REFERENCE TO RELATED APPLICATION

This application is a divisional application of U.S. application Ser. No. 15/341,853, filed Nov. 2, 2016, which claims priority to U.S. Provisional Patent Application No. 62/252,169, filed Nov. 6, 2015, and entitled, "BEAD MAKER AND DECORATOR," the entire contents of which is hereby incorporated by reference. This Non-provisional application is also related to co-pending U.S. Non-provisional application Ser. No. 15/341,650, entitled "BEAD MAKER AND DECORATOR," filed Nov. 2, 2016.

SUMMARY

Embodiments of the invention are defined by the claims below, not this summary. This high-level overview of various aspects of the invention provides an overview of the disclosure and introduces a selection of concepts that are further described in the detailed description section below. This summary is not intended to identify key features or essential features of the claimed subject matter, and is not intended to be used as an aid in isolation to determine the scope of the claimed subject matter.

In brief and at a high level, this disclosure describes, among other things, an apparatus, method, and composition for making and decorating beads. Embodiments of the invention include a pair of bead-forming blocks, with an upper block having an upper half of a bead-forming channel and a lower block having a lower half of a bead-forming channel. Block guides and track surfaces on each of the bead-forming blocks engage during contact such that the upper bead-forming channel aligns with the lower bead-forming channel. Further, the block guides ensure that the bead-forming channel halves remain aligned while the pair of blocks slide with respect to each other. A measured amount of modeling compound is positioned between the mated halves of the bead-forming channel and the transfer of the sliding blocks forms a corresponding shape of a bead within the channel. A multicomponent outer coating may then be applied to the formed bead by rolling the exterior of the bead in a reservoir of a coating mixture. The outer coating may include a gel-like base component and an acrylic coloring component that combines to provide a marble effect to the surface of the bead.

DESCRIPTION OF THE DRAWINGS

Illustrative embodiments of the invention are described in detail below with reference to the attached drawing figures, wherein:

FIG. 1 is a perspective view of an exemplary pair of bead-forming blocks, in accordance with an embodiment of the invention;

FIG. 2 is a perspective view of an exemplary pair of bead-forming blocks, in accordance with an embodiment of the invention;

DETAILED DESCRIPTION

Figure 3:
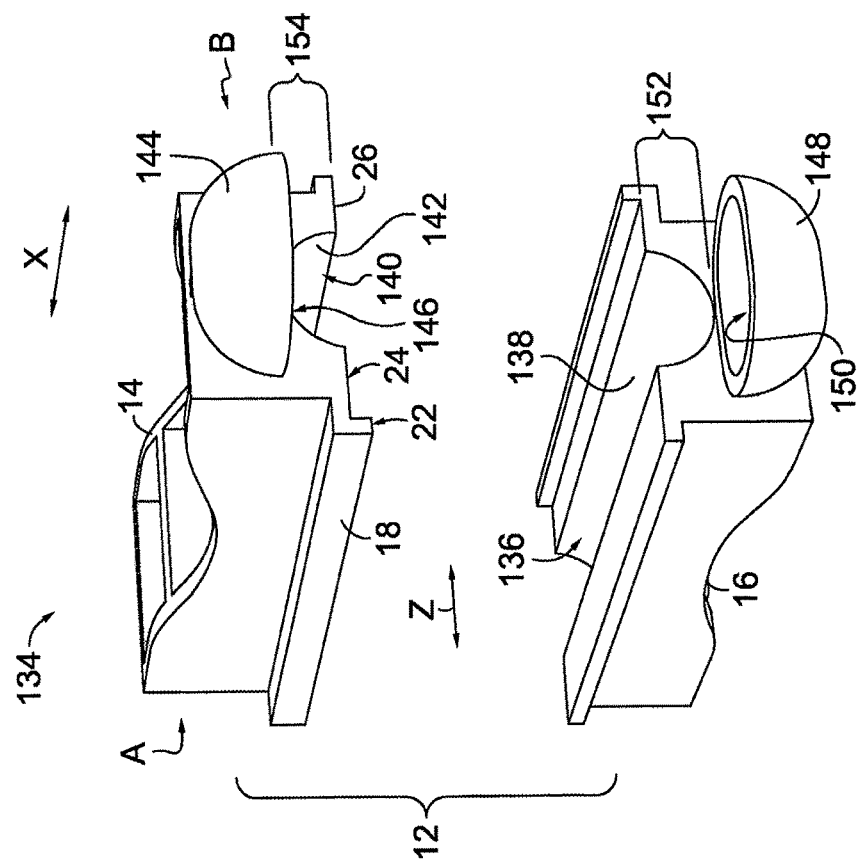
FIG. 3 is a perspective view of an exemplary pair of bead-forming blocks, in accordance with an embodiment of the invention.

The subject matter of embodiments of the invention is described with specificity herein to meet statutory requirements. The description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention are directed to an apparatus, method, and composition for making and decorating beads. Embodiments of the invention include a pair of bead-forming blocks, with an upper block having an upper half of a bead-forming channel and a lower block having a lower half of a bead-forming channel. Block guides and track surfaces on each of the bead-forming blocks engage during contact such that the upper bead-forming channel aligns with the lower bead-forming channel. Further, the block guides ensure that the bead-forming channel halves remain aligned during sliding of the pair of blocks with respect to each other. A measured amount of modeling compound is positioned between the mated halves of the bead-forming channel and the transfer of the sliding blocks forms a corresponding shape of bead within the channel. A multicomponent outer coating may then be applied to the formed bead by rolling the exterior of the bead in a reservoir of a coating mixture. The outer coating may include a gel-like base component and an acrylic coloring component that combine to provide a marble effect to the surface of the bead.

In one embodiment of the invention, a bead-making apparatus is provided. The bead-making apparatus includes a first bead-forming block comprising a first bead-forming channel along a longitudinal axis of the first bead-forming block, wherein the first bead-forming channel comprises a first channel shape and a first channel depth with respect to an interior surface of the first bead-forming block. The bead-making apparatus further includes a second bead-forming block corresponding to the first bead-forming block, the second bead-forming block comprising a second bead-forming channel along a longitudinal axis of the second bead-forming block, wherein the second bead-forming channel comprises a second channel shape and a second channel depth with respect to an interior surface of the second bead-forming block, wherein the first channel shape and the second channel shape are mirror images of each other. Additionally, the apparatus includes at least one integrated measuring feature coupled to one or more of the first bead-forming block and the second bead-forming block, said integrated measuring feature comprising an interior volume for measuring an amount of modeling compound.

In another embodiment of the invention, a bead-forming kit is provided. The kit includes an upper bead-forming block having an interior portion comprising an upper block guide, a first track surface, an upper bead-forming channel, and a second track surface oriented in a direction of a first axis. The kit further includes a lower bead-forming block having an interior portion comprising a lower block guide, a third track surface, a lower bead-forming channel, and a fourth track surface oriented in a direction of the first axis. The lower bead-forming channel corresponds to the upper bead-forming channel, wherein upon slidably engaging the interior portion of the upper bead-forming block with the interior portion of the lower bead-forming block, the upper block guide is adjacent the fourth track surface and the lower block guide is adjacent the second track surface. In further embodiments, the kit includes an integrated measuring feature coupled to at least one of the upper bead-forming block and the lower bead-forming block, said integrated measuring feature comprising an internal volume for measuring an amount of modeling compound for forming a bead between the upper bead-forming channel and the lower bead-forming channel.

In a further embodiment, a method for forming a bead between two bead-forming blocks includes: measuring an amount of modeling compound with a measuring feature coupled to one of a first guide block and a second guide block; depositing the measured amount of modeling compound between a first bead-forming channel of the first guide block and a second bead-forming channel of the second guide block; and translating an interior surface of the first guide block with respect to an interior surface of the second guide block such that the measured amount of modeling compound is manipulated between the first bead-forming channel and the second bead-forming channel to provide a molded bead corresponding to a first channel shape of the first bead-forming channel and a second channel shape of the second bead-forming channel.

With reference initially to the exemplary embodiment of FIG. 1, the bead-making kit 10 may include a pair of bead-forming blocks 12 that are configured to slidably engage while forming a bead of modeling material between the pair of blocks 12. The modeling material, such as a modeling compound, moldable clay, or other pliable material, is formed into a symmetrical bead based on manipulation between the pair of blocks, having a final shape corresponding to the adjacent interior surfaces of the neighboring blocks 12. In one embodiment, the exemplary pair of bead-forming blocks 12 includes a first bead-forming block 14 with features that mirror a second bead-forming block 16. The first bead-forming block 14 includes a first block guide 18 having a first block guide depth 20 based on a spacing between the block guide outer edge 22 and the adjacent first track surface 24. Further, the bead-forming block 14 includes a second track surface 26 arranged in the same plane as the first track surface 24, which together provide a common contact surface for engaging with an adjacent second bead-forming block 16.

Further, the second bead-forming block 16 includes a second block guide 19 having a second block guide depth 28, a block guide outer edge 30 adjacent a third track surface 32, and a fourth track surface 34. In embodiments, the third track surface 32 and the fourth track surface 34 are arranged in the same plane to provide a common contact surface for engaging with an adjacent block, such as the first bead-forming block 14. For example, the pair of blocks 12 may be slidably engaged based on 1) contact between the first track surface 24 and the fourth track surface 34, and 2) contact between the second track surface 26 and the third track surface 32. As shown in the example of FIG. 1, the first block guide 18 and the second block guide 19 may maintain alignment and/or contact between at least a portion of the opposing track surfaces 24/34 and 26/32.

The pair of bead-forming blocks 12 further includes corresponding halves of a bead-forming channel for creating a molded bead of modeling clay. As shown in the example of FIG. 1, the first bead-forming block 14 includes a bead-forming channel 36 that coordinates with the opposing bead-forming channel 38 of the second bead-forming block 16. The channel shapes 40 and 42 of the bead-forming channels 36 and 38 are mirror images of each other when the interior surface 46 of the first bead-forming block 14 is facing the interior surface 50 of the second bead-forming block 16. As such, a user may manipulate the exterior surfaces 44 and 48 of the respective bead-forming blocks 14 and 16 while slidably engaging an amount of modeling compound between the opposing bead-forming channels 36 and 38 in a direction along the x-axis.

In one embodiment of the invention, an integrated measuring feature 52 and 56 may be provided in association with one or both of the pair of bead-forming blocks 12. An interior volume 54 and 58 of the integrated measuring features 52 and 56 correspond to a volume of modeling compound for manipulation by the particular pair of bead-forming blocks 12, such as the first bead-forming block 14 and the second bead-forming block 16 of FIG. 1. For example, an amount of space between the bead-forming channels 36 and 38 corresponds to a total amount of modeling compound inside the integrated measuring feature 52 or 56. A user may utilize either of the integrated measuring features 52 and 56 for measuring a specific amount of clay corresponding to the channel space between the bead-forming channels 36 and 38. However, a user may also choose not to utilize either of the integrated measuring features 52 and 56, instead opting to manually estimate the appropriate amount of clay for insertion into the corresponding channel space.

In further embodiments, the bead-forming channels 36 and 38 may include a surface feature 64, such as a rough surface, a smooth surface, a raised/lowered textured surface, and/or other surface characteristics, for slidably engaging an amount of modeling clay between the adjacent channels. For example, a contact surface between the adjacent bead-forming channels 36 and 38 may require a minimum amount of traction for rolling a bead of a modeling compound between the bead-forming channels 36 and 38, while maintaining travel of the modeling material and minimizing spreading of the compound onto the surface of the channel.

In further aspects, the first bead-forming channel 36 is recessed with respect to the first track surface 24 and the second track surface 26 at a depth 60 from the interior surface 46. Similarly, the second bead-forming channel 38 is recessed with respect to the third track surface 32 and the fourth track surface 34 at a depth 62 from the interior surface 50. During manipulation, the first block guide 18 may contact an outer edge of the fourth track surface 34, while the second block guide 19 may contact an outer edge of the second track surface 26. In further aspects, based on contact between the interior surfaces 46 and 50, and parallel positioning of the first block guide 18 and the second block guide 19, the blocks may remain engaged along the interior surfaces 46 and 50, and refrain from shifting with respect to the y-axis or z-axis while sliding along the x-axis.

The exemplary pair of bead-forming blocks 12 in FIG. 2 provides another embodiment of a bead-making kit 66. In this example, the interior surface 108 on a third bead-forming block 68 faces an interior surface 110 of the fourth bead-forming block 70. A user may utilize either of the integrated measuring features 98 and 102, coupled to the blocks 12, for measuring a specific amount of clay corresponding to the open channel space between the bead-forming channels 92 and 94, having bead-forming channel depths 82 and 90, respectively. In this example, the interior volume 100 of the integrated measuring feature 98 and the interior volume 104 of the integrated measuring feature 102 each corresponds to a measured volume of modeling compound/clay for manipulation between the third bead-forming block 68 and the fourth bead-forming block 70 of FIG. 2. In embodiments, a single integrated measuring feature may be provided, coupled to one of the pair of blocks 12. In further aspects, where multiple integrated measuring features are coupled to the pair of blocks 12, each of the integrated measuring features includes an interior volume that satisfies the requisite amount of modeling compound for manipulation between the blocks 12. As such, a measured amount of modeling compound that fills the interior volume 100 or a measured amount of modeling compound that fills the interior volume 104 may be used to satisfy the void between both the third bead-forming block 68 and the fourth bead-forming block 70, as such measured interior volume corresponds to the requisite measured amount of modeling compound for forming a bead within the open space of the mated bead-forming channels 92 and 94.

Once the measured amount of modeling compound is positioned between the pair of blocks 12, within the space aligned between bead-forming channels 92 and 94, a user may manipulate the exterior surfaces 106 and 112 of the respective bead-forming blocks 68 and 70 while slidably engaging the measured amount of modeling compound between the opposing bead-forming channels 92 and 94 in a direction along the x-axis. In embodiments, the third bead-forming block 68 includes a third block guide 72 having a block guide outer edge 76, a first track surface 78, and a second track surface 80. Further, the fourth bead-forming block 70 includes a fourth block guide 74 having a block guide outer edge 84, a third track surface 86, and a fourth track surface 88. In embodiments, the pair of blocks 12 may slidably engage based on 1) contact between the first track surface 78 and the fourth track surface 88, and 2) contact between the second track surface 80 and the third track surface 86.

As shown in the example of FIG. 2, the third block guide 72 and the fourth block guide 74 may maintain alignment and/or contact between at least a portion of the opposing track surfaces 78/88 and 80/86. In one aspect, the third block guide 72 is configured to engage with an outer edge of the fourth track surface 88, while the fourth block guide 74 is configured to engage an outer edge of the second track surface 80, such that the interior surfaces 108 and 110 remain contacted during bead formation and refrain from shifting apart with respect to the y-axis or z-axis while the pair of blocks 12 slide along the x-axis.

Turning next to FIG. 3, an exemplary bead-making kit 114 includes a pair of bead-forming blocks 12 having an upper channel 116 and a channel depth 128, a lower channel 118 with a channel shape 120 and a channel depth 126, an upper integrated measuring feature 132 with an interior volume 130, and a lower integrated measuring feature 124 with an interior volume 122. In embodiments, the interior chamber formed between the upper and lower channels 116 and 118, having channel shape 120, provides a specific channel opening for molding a measured amount of modeling compound into a particular bead shape. In one aspect, the kit 114 includes one or more integrated measuring features, such as one or both of the integrated measuring features 132 and 124, for determining a threshold amount of modeling compound required to mold a bead using the upper and lower channels 116 and 118. As such, the interior volume 130 of the upper integrated measuring feature 132 may be used to measure a threshold amount of modeling compound for molding a bead with the upper and lower channels 116 and 118 of the kit 114. Similarly, the interior volume 122 of the lower integrated measuring feature 124 may be used to measure a threshold amount of modeling compound for molding a bead with the kit 114. In some embodiments, integrated measuring features 132 and 124 include an interior volume for measuring the requisite amount of modeling compound for manipulation between the mated upper and lower channels 116 and 118 of the pair of bead-forming blocks 12 in the kit 114.

Figure 4:
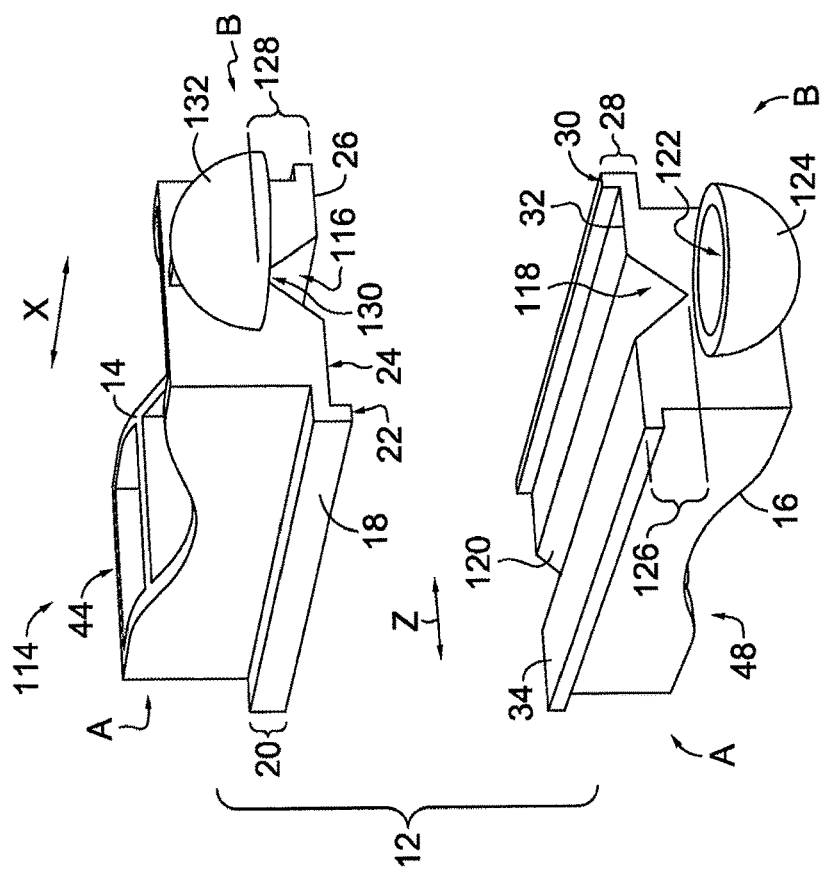
FIG. 4 is a perspective view of an exemplary pair of bead-forming blocks, in accordance with an embodiment of the invention.

In FIG. 4, an exemplary bead-making kit 134 includes a pair of bead-forming blocks 12 having an upper channel 142 with a channel shape 140 and a channel depth 154, a lower channel 138 with a channel shape 136 and a channel depth 152, an upper integrated measuring feature 144 with an interior volume 146, and a lower integrated measuring feature 148 with an interior volume 150. In embodiments, the interior chamber formed between channel shape 140 and channel shape 136 provides a specific channel opening for molding a measured amount of modeling compound into a particular bead shape. In one aspect, the kit 134 includes one or more integrated measuring features, such as one or both of the integrated measuring features 144 and 148, for determining a threshold amount of modeling compound required to mold a bead using the upper and lower channels 142 and 138. As such, the interior volume 146 of the upper integrated measuring feature 144 may be used to measure a threshold amount of modeling compound for molding a bead with the upper and lower channels 142 and 138 of the kit 134. Similarly, the interior volume 150 of the lower integrated measuring feature 148 may be used to measure a threshold amount of modeling compound for molding a bead with the kit 134. In some embodiments, integrated measuring features 144 and 148 include an interior volume for measuring the requisite amount of modeling compound for manipulation between the mated upper and lower channels 142 and 138 of the pair of bead-forming blocks 12 in the kit 134.

As shown in the examples of FIGS. 1-4, a pair of bead-forming blocks 12 includes an upper block having an upper bead-forming channel and a lower block having a lower bead-forming channel. In embodiments, the upper and lower bead-forming channels have the same internal channel shape, such as a curved channel shape on an upper bead-forming block that is mirrored by a curved channel shape on the mated lower bead-forming block. As such, with respect to the interior surface of each block, the channel depth of upper and lower bead-forming blocks are also consistent between pairs of bead-forming blocks. When paired together, the mirrored channel shape and channel depth of upper and lower bead-forming channels provide an internal chamber between the upper and lower channels for molding a particular shape of bead from a threshold amount of modeling compound.

In some aspects, the threshold amount of modeling compound corresponding to a particular pair of bead-forming blocks (as determined by at least one integrated measuring feature coupled to at least one block in the pair) is a predetermined volume of modeling compound configured to contact both the upper and lower channels of a pair of bead-forming blocks when positioned between the mated upper and lower channels. As such, based on contacting the internal surface of the mated upper and lower channels, the predetermined volume of modeling compound may be formed into a bead having an exterior that corresponds to the particular channel shape while the pair of bead-forming blocks are translated back and forth along the x-axis. Additionally, in one embodiment, the length of the bead-forming channel may be between about 50 and 70 mm, while in another embodiment, the bead-forming channel of a pair of bead-forming blocks may be between about 62 and 64 mm long. With such length, the corresponding width of the channel for providing a particular bead shape may be between about 8 and 15 mm. For example, a capsule-shaped channel for producing an oval-shaped bead and/or having a capsule-shaped integrated measuring feature may include a channel width of about 13 mm, while in another example, a semicircle-shaped channel for producing a spherical bead and/or having a hemisphere-shaped integrated measuring feature may include a channel width of about 10 mm. In another embodiment of the invention, a bead-forming channel may include a channel length of about 17 mm and a channel depth of about 4 mm. In another example, a v-shaped (or other shape) bead-forming channel may include a channel width of about 12 mm and a channel side length of about 9 mm. The channel shapes discussed in this disclosure are not meant to be limiting, and any shape or size of the upper and lower channels are considered to be within the scope of this disclosure.

The threshold amount of modeling compound measured by an integrated measuring feature may be a predetermined volume of modeling compound within a range of requisite modeling compound, such as an integrated measuring feature having an interior volume X, with a range of measured volume between 0.9X and 1.1X modeling compound, according to some embodiments of the invention. In another embodiment, a predetermined volume of modeling compound corresponds to a specific amount of clay that is moveable within the interior chamber formed between the upper and lower channels of a pair of bead-forming blocks. In other words, the predetermined volume may be measured for each different pair of bead-forming blocks because each pair of blocks with a different upper and lower channel shape has a different threshold requirement for a moveable amount of clay between paired, sliding blocks having that particular channel configuration, such as the channel shape, depth, width, size, surface, etc. Accordingly, embodiments of the bead-forming blocks described herein may be used to produce beads of numerous sizes provided that the dimensions of the components are suitably scaled. For example, if the volume of an integrated measuring feature is increased to provide a measured volume of a larger bead, the dimensions of the corresponding bead-forming channels may be increased. Similarly, upon increasing the measured volume of a larger bead, the dimensions of a corresponding reservoir for applying a coating mixture to the bead may be increased proportionally to facilitate rolling of the bead and exposure of the increased size of the bead surface. In one aspect, a smaller bead-forming system including a smaller integrated measuring feature and a smaller set of bead-forming channels may be used to generate a small-sized bead for coating in a smaller reservoir. In another aspect, a larger bead-forming system including a larger integrated measuring feature and a larger set of bead-forming channels may be used to generate a larger-sized bead for coating in a larger reservoir.

As such, according to various embodiments, the proportion, scale, size, dimension, and/or orientation of the bead-forming channels may change based on a size of bead produced. While a longer and/or deeper bead-forming channel may be used to generate a larger bead, in one example, a shorter and/or shallower bead-forming channel may be used to generate a smaller bead. For example, a kit including multiple bead-forming devices may include differently shaped "scoops" having a hemispherical configuration that is coupled to at least one of the bead-forming blocks to which the scoop volume corresponds. In some aspects, an integrated measuring feature or scoop may include a variety of shapes while maintaining a particular volume corresponding to a produced bead. For example, a scoop may have a capsule shaping, elongated in an oval orientation, while in another example, a scoop may include a spherical shaping, having a half-circle appearance. According to one embodiment, a hemisphere-shaped integrated measuring feature may include a volume between about 0.5 to 1.5 cubic centimeters ($cm^3$), while in another embodiment, the integrated measuring feature may include a volume between about 0.6 and 1.2 $cm^3$. In another embodiment, a capsule-shaped integrated measuring feature may include a volume between about 1.2 and 3.2 $cm^3$, while in further embodiments, the volume may be between about 1.5 and 3.0 $cm^3$.

In another aspect of the invention, a reservoir for coating the bead may include a corresponding volume based on the one or more of the integrated measuring feature volume, the bead-forming channel shape, and the produced bead size. For example, the reservoir/pan volume may be between about 2 to 5 $cm^3$, while in further aspects, the reservoir includes a cavity having between about 3 and 4 $cm^3$ for holding the coating mixture, such as a reservoir volume of 3.5 $cm^3$, in some embodiments.

Additionally, the reservoir may include one or more features for securing the coating mixture and/or applying it to the formed bead. For example, the reservoir may include one or more reservoir sides that slope inward towards the main volume of the reservoir. Based on a variety of configurations, the bead-coating reservoir may include a variable length, width, and depth. In one example, the reservoir includes a length and width at an upper portion that tapers to the length and width of the lower portion based on a sloping of the sides of the reservoir. In one example, a reservoir may include a particular opening size and a particular reservoir bottom that provides reservoir dimensions that correlate to the circumference of the bead at its widest portion, such that the bead may be rolled within the reservoir by at least one complete rotation for coating the entire surface of the bead with gel and/or paint. For example, the reservoir may include dimensions between about 30 and 35 mm at a top portion, and between about 15 to 20 mm at a bottom portion, providing a reservoir for coating a surface of a bead with at least one complete rotation of the bead within the reservoir. In another example, the reservoir may include dimensions between about 32 and 34 mm at a top portion of the reservoir opening, and between about 16 to 18 mm at a bottom portion of the reservoir, providing a reservoir volume and shape that accommodates a coating of an entire surface of a particular-sized bead. In other words, the length of the reservoir/pan may be at least the circumference of a bead, and in further embodiments, the length of the reservoir/pan is slightly more than the circumference of the bead such that a complete rotation of the bead is facilitated (i.e., all surfaces of the bead are coated as it is rolled from one end to the other end of the reservoir).

In one aspect, the reservoir includes a threshold length such that a user will roll the bead without replicating the coating. For example, if the reservoir is longer in length that the circumference of the bead, a user may roll the bead longer than necessary to coat each surface of the bead, and may therefore cause smearing and/or blending of the paint/gel coating. In another example, the depth of the reservoir may be a particular size to provide for full immersion of the bead without rolling, with a reservoir depth corresponding to the bead diameter. In yet another example, the reservoir depth may facilitate immersion of a hemisphere of the bead surface.

Figure 5:
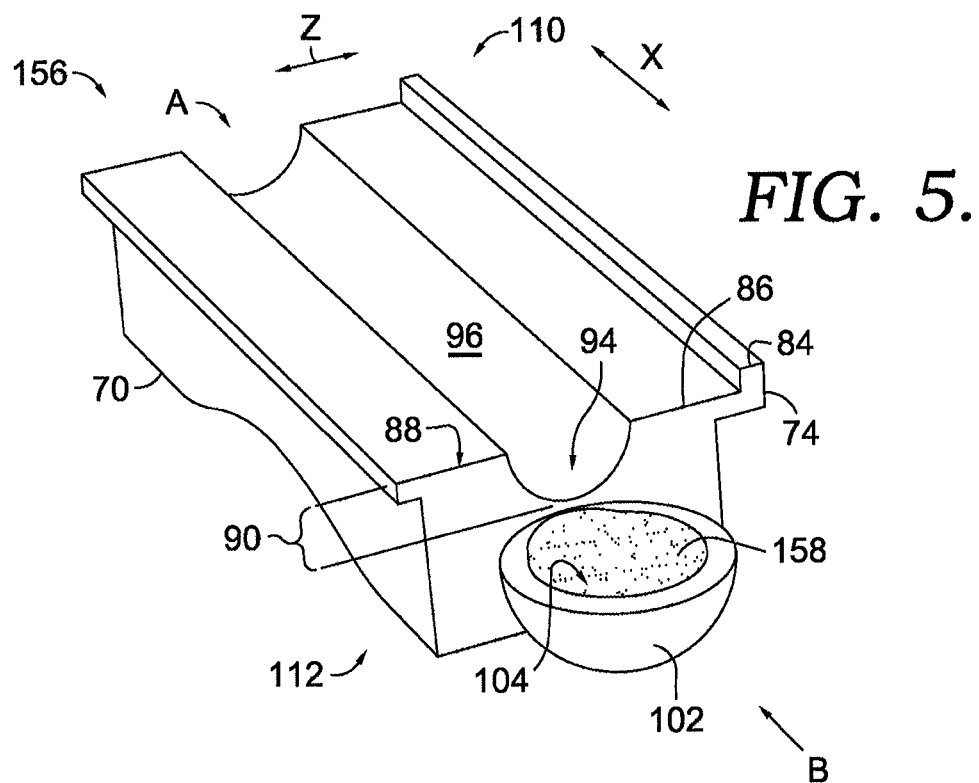
FIG. 5 is a perspective view of an exemplary bead-forming block with an amount of modeling compound in the integrated measuring device, in accordance with an embodiment of the invention.
Figure 6:
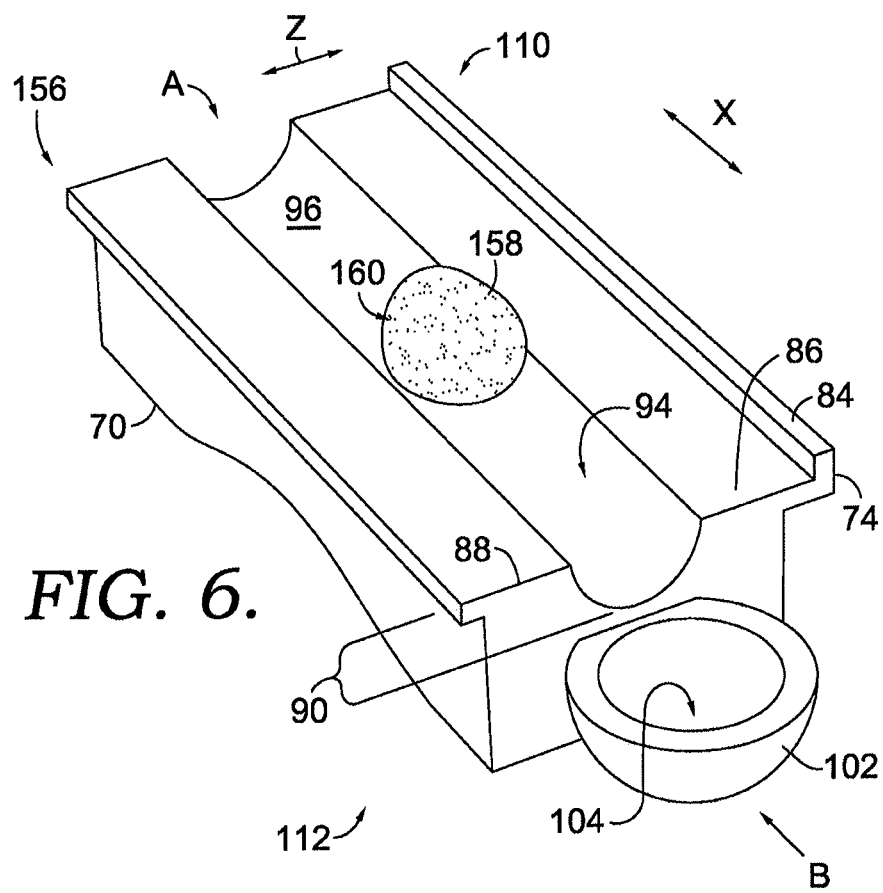
FIG. 6 is a perspective view of an exemplary bead-forming block with a measured amount of modeling compound positioned for rolling, in accordance with an embodiment of the invention.
Figure 7:
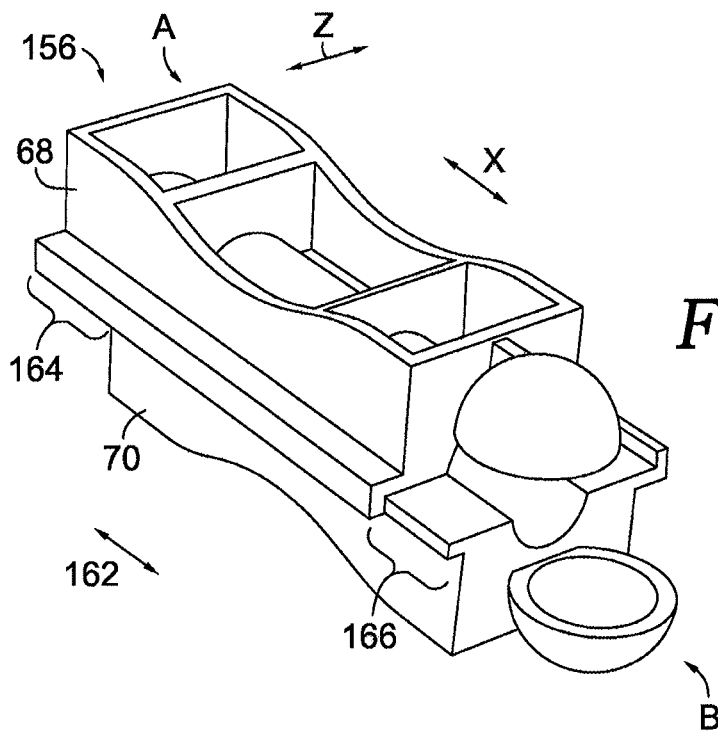
FIG. 7 is a perspective view of a slidably engaged pair of bead-forming blocks, in accordance with an embodiment of the invention.

Turning next to FIG. 5, an exemplary bead-forming block 156 includes a bead-forming channel 94 oriented with a first end A and a second end B along the x-axis. Based on the channel shape 96 of the bead-forming channel 94, the bead-forming block 156 includes an integrated measuring feature 102 having an internal volume 104 that is used to provide a measured portion 158 of modeling compound when formed within the integrated measuring feature 102. In FIG. 6, the measured amount of modeling compound 158 having a surface 160 is placed within the bead-forming channel 94. Once paired with the upper bead-forming channel of upper bead-forming block 68 in FIG. 7, the upper and lower bead-forming blocks 68 and 70 are shifted in a forward and backward direction of motion 162, from the first end A to the second end B along the x-axis. In some aspects, shifting along the x-axis (i.e., back and forth along the direction of motion 162) displaces the upper and lower blocks 68 and 70 a first amount 164 with respect to the first end A, and a corresponding second amount 166 with respect to the second end B. In further aspects, while maintaining the modeling compound 158 between the two blocks, the upper block 68 may be shifted towards the second end B to displace the second end B of the upper block 68 a first amount 164, and further displace the first end A a second amount 166 with respect to the lower block 70. Such back and forth manipulation of the paired upper and lower blocks 68 and 70 causes repeated and/or consistent translation of the modeling compound between the blocks during bead formation.

Figure 8:
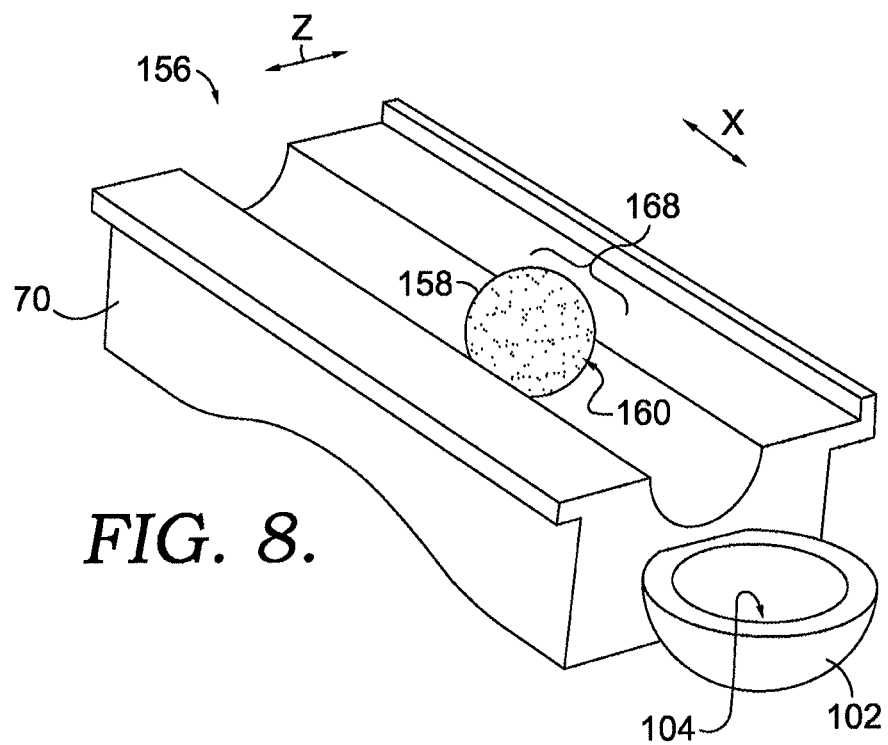
FIG. 8 is a perspective view of a bead-forming block revealing a formed bead, in accordance with an embodiment of the invention.

Upon translating the upper and lower blocks multiple times with respect to each other, along the direction of motion 162, the upper block 68 is removed to reveal the formed bead 168 within the channel of lower block 70. In embodiments, the bead formed in FIG. 8 is formed within the mated channels of the upper and lower blocks, based on a specific amount of measured modeling compound determined using the integrated measuring feature 102.

Figure 9:
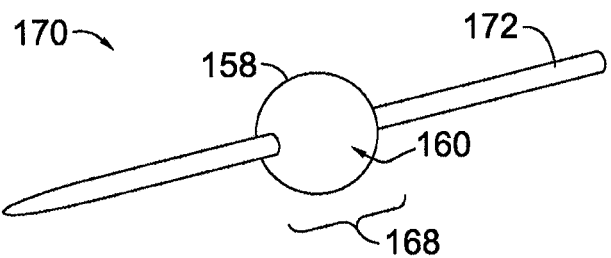
FIG. 9 is an exemplary formed bead with a piercing tool inserted through a portion of the bead, in accordance with an embodiment of the invention.

Once the measured modeling compound is formed into a bead, as shown in FIG. 9, a piercing tool 172 may be inserted through a portion of the formed bead 168, in accordance with an embodiment of the invention. Once pierced, the formed bead may be further manipulated, such as having a coating mixture applied to an outer surface of the bead, as further described below.

Figure 10:
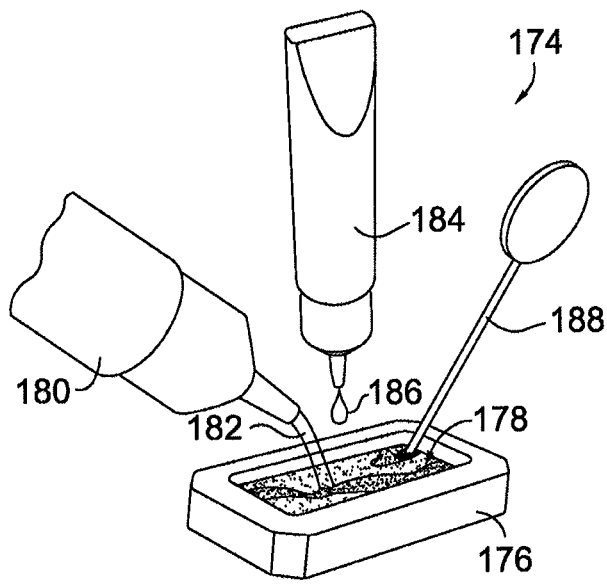
FIG. 10 is a perspective view of an exemplary coating mixture tray during preparation of a multicomponent coating mixture for applying to the formed bead, in accordance with an embodiment of the invention.
Figure 11:
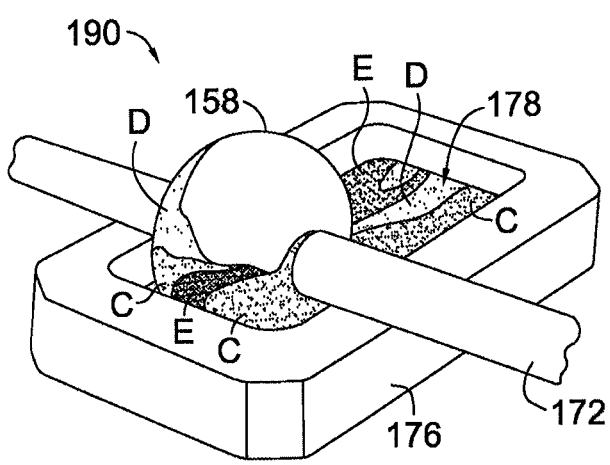
FIG. 11 is a perspective view of an exemplary first pattern of a multicomponent coating mixture applied to a formed bead surface, in accordance with an embodiment of the invention.
Figure 12:
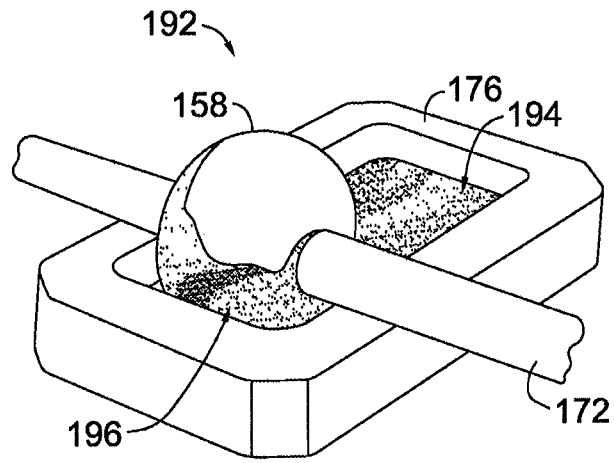
FIG. 12 is a perspective view of an exemplary second pattern of a multicomponent coating mixture applied to a formed bead surface, in accordance with an embodiment of the invention.
Figure 13:
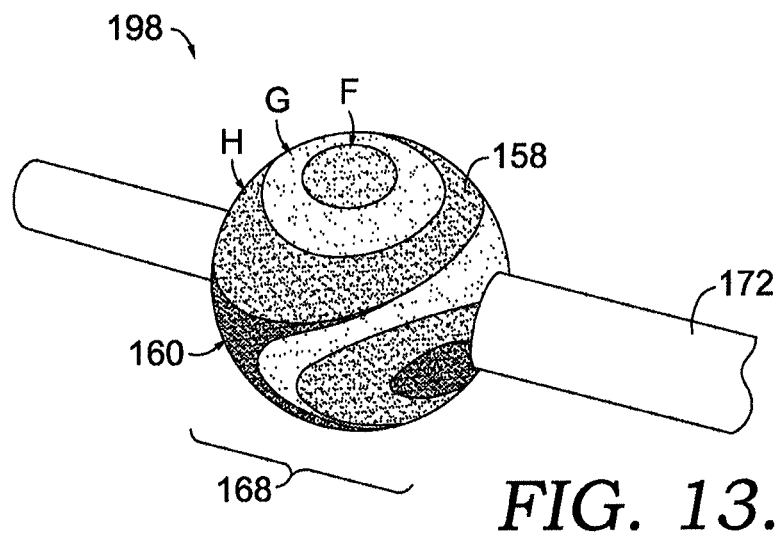
FIG. 13 is a front perspective view of a formed bead having a multicomponent coating mixture applied to the spherical bead surface, in accordance with an embodiment of the invention.

In the exemplary embodiment of FIG. 10, coating mixture components 174 may be provided with a bead-forming kit for application of one or more coloring features to an exterior surface of the formed bead. In one embodiment, a tray 176 may be used to combine a first bottle 180 of a first solution 182 with a second bottle 184 of a second solution 186, which may be stirred using a mixing tool 188 to provide a multicomponent coating mixture 178. In FIG. 11, an exemplary first pattern 190 of a multicomponent coating mixture 178 is applied to the surface of a formed bead 168, in accordance with an embodiment of the invention. Based on the mixing characteristics of the multicomponent coating mixture 178, a pattern of one or more coloring features may be applied to the formed bead 168, such as a first pattern feature C, a second pattern feature D, and a third pattern feature E. In response to further mixing and/or combining of the multicomponent coating mixture 178, a dispersed multicomponent coating mixture 178 may produce a blended application 196 of the same coloring features, as shown in FIG. 12. As shown in FIG. 13, upon additional application to the outer surface 160 of the formed bead 168, a covered bead 198 may be formed, having one or more different patterns of coloring application, including fourth pattern feature F, fifth pattern feature G, and sixth pattern feature H on the outer surface 160 of the formed bead 168.

Figure 14:
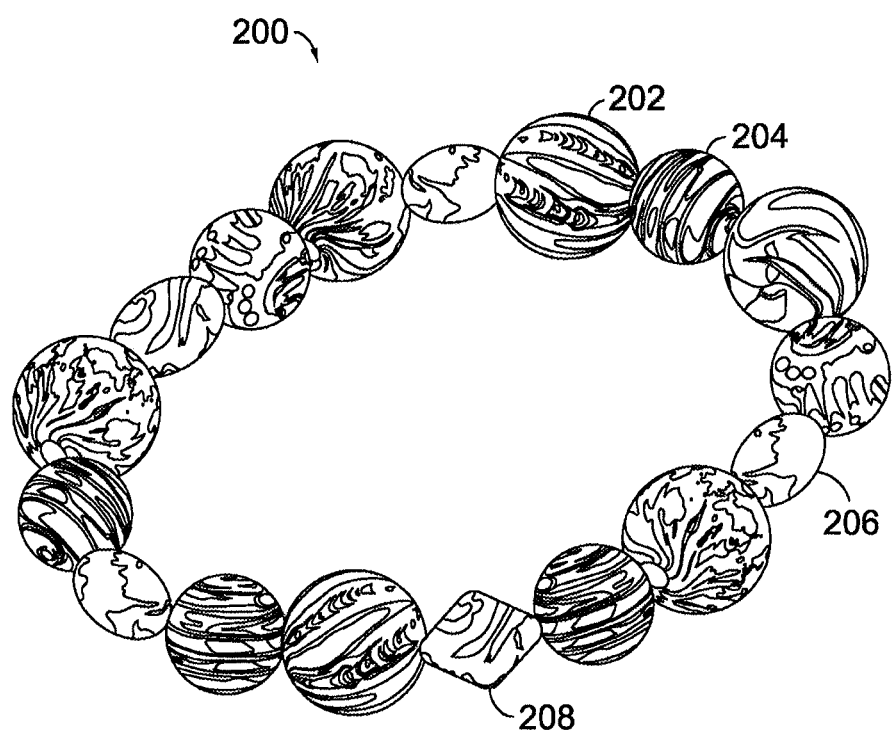
FIG. 14 is a grouping of multiple formed beads having exterior coatings of multicomponent coating mixture, as strung together to form a bracelet, in accordance with an embodiment of the invention.

Turning next to FIG. 14, a grouping of multiple formed beads 200 having exterior coatings of multicomponent coating mixtures are depicted in accordance with an embodiment of the invention. Each of the shaped beads in the grouping of multiple formed beads 200 may be formed using a particular pair of bead-forming blocks, such as the bead-forming blocks depicted in FIGS. 1-4 discussed above. In one embodiment, a first bead 202 may be formed using the pair of bead-forming blocks depicted in FIG. 4, having an upper channel 142 and lower channel 138 configured to form a spherical first bead 202. In another embodiment, a second bead 204 may be formed between the bead-forming blocks of FIG. 2, having an upper channel 92 and lower channel 94 configured to form a spherical second bead 204.

In further aspects of the invention, a third bead 206 may be formed between the bead-forming blocks of FIG. 1, having an upper channel 36 and a lower channel 38 to form an oval third bead 206. In another aspect, a fourth bead 208 may be formed between the bead-forming blocks of FIG. 3, having an upper channel 116 and a lower channel 118 configured to form a conical fourth bead 208.

Figure 15:
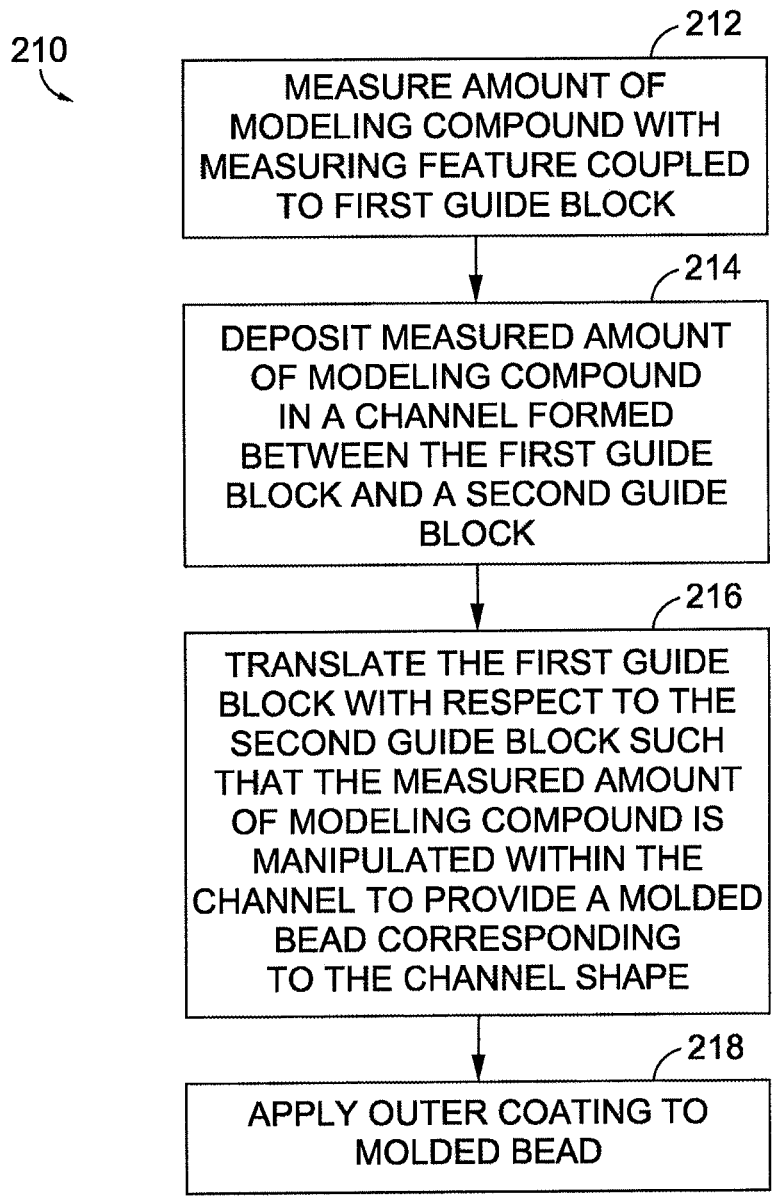
FIG. 15 is an exemplary method for forming a bead with a pair of bead-forming blocks and decorating the formed bead with an outer coating, in accordance with an embodiment of the invention.

Turning next to FIG. 15, an exemplary method 210 for forming a bead with a pair of bead-forming blocks and decorating the formed bead with an outer coating is provided in accordance with an embodiment of the invention. At block 212, an amount of modeling compound is measured with an integrated measuring feature coupled to a first bead-forming block. Once the modeling compound is measured, at block 214, it is deposited in the channel formed between the first bead-forming block and a second, corresponding bead-forming block. At block 216, the first bead-forming block is translated with respect to the second bead-forming block such that the measured amount of modeling compound is manipulated within the channel to provide a molded bead corresponding to the channel shape. For example, a conical bead may be formed by a particular shape of mated upper and lower channels on a pair of bead-forming blocks. In another example, a spherical bead may be formed by a particular shape of mated upper and lower channels on a pair of bead-forming blocks. At block 218, an outer coating may be applied to the molded bead, such as the multicomponent coating mixture described above.

In another embodiment of the invention, the multicomponent coating mixture (or "coating mixture") is provided. As described herein, the coating mixture is a liquid that may be applied to a formed bead by rolling the exterior of the bead in a reservoir that contains the coating mixture. The coating mixture thus forms an outer coating on the formed bead. The coating mixture includes a gel-like base component and one or more acrylic coloring components.

The gel-like base component and acrylic coloring component(s) may combine to provide a patterned effect on the surface of the bead. For example, the patterned effect may be a "marbleized effect," wherein patterns created by streaks of color on the bead resemble patterns found in marble. In certain embodiments, the marbleized effect is made possible by the heterogeneity of the coating mixture, i.e., the gel-like base component and acrylic coloring component(s) do not immediately blend together to form a homogeneous solution when they are combined. Stated another way, each acrylic coloring component does not immediately disperse and become solubilized within the gel-like base component. Instead, the coating mixture is initially heterogeneous after the acrylic coloring component(s) and gel-like base component are combined, whereby each acrylic coloring component resembles a floating "film" in the gel-like base component. If multiple acrylic coloring components are added to the gel-like base component, they do not initially mix to provide a uniform color, but form floating "films" next to one another (with multiple colors visible). The floating films are fluid and may be moved around within the gel-like base component to form a design, such as a marbleized design (e.g., by using a mixing tool 188). According to particular embodiments, the bead is made from a material to which the coating mixture easily adheres to provide a patterned effect; for example, the bead may comprise a clay material, as described herein. A marbleized effect that is created by streaks of color in the coating mixture can be transferred to the bead.

Embodiments of multiple acrylic coloring components in the gel-like base component are depicted in FIGS. 10 and 11. As described herein, the multiple acrylic coloring components may begin to blend together in response to further mixing of the coating mixture; for example, by using a mixing tool 188 or by rolling the exterior of a bead in the coating mixture. An embodiment of a coating mixture in which the acrylic coloring components have begun to blend together following mixing is depicted in FIG. 12.

Embodiments of a marbleized effect are depicted in FIG. 14, in which the multicomponent coating mixtures provide marbleized effects on the formed beads 200. According to particular embodiments, the multicomponent coating mixture does not contain any oil-based paints, and therefore does not contain any drying oils. In certain embodiments, the multicomponent coating mixture does not contain oil of any kind.

In one embodiment, the gel-like base component comprises, consists essentially of, or consists of: an aqueous carrier (e.g., water), one or more water-swellable clay materials, optionally one or more preservatives, and optionally one or more additives. According to particular embodiments, the gel-like base component is clear (i.e., colorless). The gel-like base component may be prepared by mixing the aqueous carrier, the water-swellable clay material(s), the optional preservative(s), and the optional additive(s) together until a substantially homogeneous composition is achieved.

According to particular embodiments, the aqueous carrier included in the gel-like base component is water. Alternatively, the aqueous carrier may include water and optionally one or more water-miscible organic solvents (e.g., one or more solvents selected from the group consisting of alcohols, glycols, glycol ethers, esters, ketones, and a combination thereof).

According to particular embodiments, the aqueous carrier is included in the gel-like base component in an amount between about 85.0 wt % and about 99.0 wt % (based on the total gel-like base component composition). Alternatively, the aqueous carrier is included in the gel-like base component in an amount between about 87.5 wt % and about 99.0 wt %, or between about 90.0 wt % and about 99.0 wt %, or between about 92.5 wt % and about 99.0 wt %, or between about 94.0 wt % and about 99.0 wt %, or between about 95.0 wt % and about 99.0 wt %, or between about 95.5 wt % and about 99.0 wt %, or between about 96.0 wt % and about 99.0 wt %, or between about 87.5 wt % and about 98.5% wt %, or between about 90.0 wt % and about 98.5 wt %, or between about 92.5 wt % and about 98.5 wt %, or between about 95.0 wt % and about 98.5 wt %, or between about 95.5 wt % and about 98.5 wt %, or between about 96.0 wt % and about 98.5 wt %, or between about 87.5 wt % and about 98.0 wt %, or between about 90.0 wt % and about 98.0 wt %, or between about 92.5 wt % and about 98.0 wt %, or between about 95.0 wt % and about 98.0 wt %, or between about 95.5 wt % and about 98.0 wt %, or between about 96.0 wt % and about 98.0 wt % (based on the total gel-like base component composition). Alternatively, the aqueous carrier is included in the gel-like base component in an amount of at least about 85.0 wt %, or at least about 87.5 wt %, or at least about 90.0 wt %, or at least about 92.5 wt %, or at least about 95.0 wt %, or at least about 95.5 wt %, or at least about 96.0 wt %, or at least about 96.5 wt %, or at least about 97.0 wt % (based on the total gel-like base component composition).

According to particular embodiments, the water-swellable clay material(s) included in the gel-like base component are colloidal layered silicates that are manufactured from naturally occurring inorganic mineral sources. "Water-swellable clay materials" are also referred to in the art as "clay thickeners," "nanoclays," "synthetic nanoclays," "water-swellable nanoclays," and "synthetic layered silicates." Water-swellable clay material swells in an aqueous carrier, such as water, to produce a thixotropic gel (also referred to as a colloidal dispersion). Non-limiting examples of water-swellable clay materials include water-swellable smectite, water-swellable bentonite, water-swellable mica, water-swellable hectorite, water-swellable montmorillonite, water-swellable saponite, water-swellable synthetic mica, and combinations thereof. In a specific embodiment, the water-swellable clay material is a synthetic layered hectorite magnesium lithium silicate. Exemplary water-swellable clay materials suitable for use in connection with the present invention are sold under the tradename Laponite® (e.g., Laponite® RD and Laponite® XLS). Laponite® is a synthetic layered hectorite magnesium lithium silicate.

According to particular embodiments, the water-swellable clay material(s) are included in the gel-like base component in a total amount between about 0.1 wt % and about 4.0 wt % (based on the total gel-like base component composition). Alternatively, the water-swellable clay material(s) are included in the gel-like base component in an amount between about 0.1 wt % and about 3.5 wt %, or between about 0.1 wt % and about 3.5 wt %, or between about 0.1 wt % and about 3.0 wt %, or between about 0.1 wt % and about 2.5 wt %, or between about 0.1 wt % and about 2.0 wt %, or between about 0.1 wt % and about 1.5 wt %, or between about 0.1 wt % and about 1.0 wt %, or between about 0.5 wt % and about 4.0 wt %, or between about 0.5 wt % and about 3.5 wt %, or between about 0.5 wt % and about 3.0 wt %, or between about 0.5 wt % and about 2.5 wt %, or between about 0.5 wt % and about 2.0 wt %, or between about 0.5 wt % and about 1.5 wt %, or between about 0.5 wt % and about 1.0 wt %, or between about 1.0 wt % and about 4.0 wt %, or between about 1.0 wt % and about 3.5 wt %, or between about 1.0 wt % and about 3.0 wt %, or between about 1.0 wt % and about 2.5 wt %, or between about 1.0 wt % and about 2.0 wt %, or between about 1.5 wt % and about 4.0 wt %, or between about 1.5 wt % and about 3.5 wt %, or between about 1.5 wt % and about 3.0 wt %, or between about 1.5 wt % and about 2.5 wt %, or between about 1.5 wt % and about 2.0 wt % (based on the total gel-like base component composition).

The one or more optional preservatives included in the gel-like base component may be biocides (e.g., anti-bacterial and/or anti-fungal agents). Various commercially-available preservatives that are suitable for use in the gel-like base component are well-known in the art. Non-limiting examples of preservatives are sold under the tradenames Mergal® and Preventol® (e.g., Mergal® 395 and Preventol® CMK NA).

According to particular embodiments, the optional preservative(s) are included in the gel-like base component in a total amount between 0 wt % and about 2.0 wt % (based on the total gel-like base component composition). Alternatively, the optional preservative(s) are included in the gel-like base component in an amount between about 0 wt % and about 2.0 wt %, or between 0 wt % and about 1.5 wt %, or between 0 wt % and about 1.0 wt %, or between 0 wt % and about 0.5 wt %, or between about 0.01 wt % and about 2.0 wt %, or between about 0.01 wt % and about 1.5 wt %, or between about 0.01 wt % and about 1.0 wt %, or between about 0.01 wt % and about 0.5 wt % (based on the total gel-like base component composition).

The one or more optional additives included in the gel-like base component may be selected from the group consisting of rheology modifiers, dispersants (e.g., surfactants), pH adjusters, anti-foaming agents, and a combination thereof. Various commercially-available additives that are suitable for use in the gel-like base component are well-known in the art. According to particular embodiments, the optional additive(s) are included in the gel-like base component in a total amount between 0 wt % and about 2.0 wt % (based on the total gel-like base component composition).

Alternatively, the optional additive(s) are included in the gel-like base component in an amount between about 0 wt % and about 2.0 wt %, or between 0 wt % and about 1.5 wt %, or between 0 wt % and about 1.0 wt %, or between 0 wt % and about 0.5 wt %, or between about 0.01 wt % and about 2.0 wt %, or between about 0.01 wt % and about 1.5 wt %, or between about 0.01 wt % and about 1.0 wt %, or between about 0.01 wt % and about 0.5 wt % (based on the total gel-like base component composition).

According to one embodiment, the gel-like base component comprises, consists essentially of, or consists of: an aqueous carrier (e.g., water) in an amount between about 92.0 wt % and about 99.0 wt %, one or more water-swellable clay materials in a total amount between about 1.0 wt % and about 4.0 wt % (e.g., Laponite® RD and/or Laponite® XLS), optionally one or more preservatives in a total amount between 0 wt % and about 2.0 wt % (e.g., Mergal® 395 and/or Preventol® CMK NA), and optionally one or more additives in a total amount between 0 wt % and about 2.0 wt %.

According to another embodiment, the gel-like base component comprises, consists essentially of, or consists of: an aqueous carrier (e.g., water) in an amount between about 93.0 wt % and about 98.5 wt %, one or more water-swellable clay materials in a total amount between about 1.5 wt % and about 3.0 wt % (e.g., Laponite® RD and/or Laponite® XLS), optionally one or more preservatives in a total amount between 0 wt % and about 2.0 wt % (e.g., Mergal® 395 and/or Preventol® CMK NA), and optionally one or more additives in a total amount between 0 wt % and about 2.0 wt %.

According to another embodiment, the gel-like base component comprises, consists essentially of, or consists of: an aqueous carrier (e.g., water) in an amount between about 96.0 wt % and about 98.0 wt %, one or more water-swellable clay materials in a total amount between about 1.5 wt % and about 2.0 wt % (e.g., Laponite® RD and/or Laponite® XLS), one or more preservatives in a total amount of between 0.1 wt % and about 1.0 wt % (e.g., Mergal® 395 and/or Preventol® CMK NA), and optionally one or more additives in a total amount of between 0 wt % and about 1.0 wt %.

According to an exemplary embodiment, the gel-like base component comprises, consists essentially of, or consists of the following components:
Deionized water—97.06%
Laponite® RD—1.5%
Laponite® XLS—0.44%
Mergal® 395—0.8%
Preventol® CMK NA—0.15%.

According to particular embodiments, the acrylic coloring components (which are combined with the gel-like base component to form the coating mixture) are liquid acrylic paints, which are commercially available in a wide variety of colors. Acrylic paint typically includes a pigment suspension in an acrylic polymer emulsion. In certain embodiments, each acrylic coloring component is a liquid acrylic paint that comprises, consists essentially of, or consists of an aqueous carrier (e.g., water and optionally one or more water-miscible organic solvents), one or more acrylic resins (typically referred to as a "binder"), one or more pigments, and optionally one or more additives (e.g., rheology modifiers, dispersants, pH adjusters, anti-foaming agents, etc.). Unlike oil-based paints, which include oil as the vehicle (e.g., linseed oil or another drying oil), water typically serves as the vehicle for suspension of the acrylic resin that is the binder in acrylic paint. Thus, oil paint is "oil-based," whereas acrylic paint is typically "water-based."

In an embodiment of the invention, a bead-forming kit includes a gel-like base component and one or more acrylic coloring components. The bead-forming kit may also include a bead-making apparatus in accordance with any of the embodiments described herein. In certain embodiments, the gel-like base component and each of the one or more acrylic coloring components is provided in a separate container. For example, the bead-forming kit may include the gel-like base component inside a first container, a first acrylic coloring component inside a second container, a second acrylic coloring component inside a third container, a third acrylic coloring component inside a fourth container, etc. According to particular embodiments, each of the acrylic coloring components is a different color; for example, the kit may include one or more acrylic coloring components selected from the group consisting of a red acrylic coloring component, an orange acrylic coloring component, a yellow acrylic coloring component, a green acrylic coloring component, a blue acrylic coloring component, a purple acrylic coloring component, a pink acrylic coloring component, a white acrylic coloring component, a black acrylic coloring component, a brown acrylic coloring component, and a combination thereof. According to certain embodiments, the kit contains a plurality of the aforementioned acrylic coloring components.

In a further embodiment, a method for forming a bead includes decorating the formed bead with an outer coating. Stated another way, the method includes applying a multi-component coating mixture to the surface of the bead (e.g., by rolling the exterior of the bead in a reservoir of the multicomponent coating mixture). The multicomponent coating mixture, and the resulting outer coating on the bead, include the gel-like base component and the one or more acrylic coloring components. According to particular embodiments, the method further comprises forming the bead between two bead-forming blocks in accordance with any of the embodiments described herein, prior to applying the multicomponent coating mixture to the outer surface of the bead.

According to particular embodiments, the method for forming a bead includes mixing the gel-like base component and the one or more acrylic coloring components together (e.g., in a reservoir) to form a coating mixture, and applying the coating mixture onto the surface of the bead, thereby forming an outer coating on the bead. The outer coating can provide a patterned effect, such as a marbleized effect, on the bead. The method may further comprise drying the coated bead; for example, by allowing the bead to air dry.

As illustrated in the exemplary embodiment of FIG. 10, mixing the gel-like base component and the acrylic coating component(s) together may comprise dispensing an amount of the gel-like base component 182 from a first bottle 180 into the reservoir 176, and dispensing an amount of an acrylic coating component 186 from a second bottle 184 into the gel-like base component 182. For example, a user may dispense the gel-like base component into the reservoir, and dispense each desired acrylic coating component dropwise into the gel-like base component to provide the multicomponent coating mixture 178. The user may select which acrylic coating component(s) to add to the gel-like base component, based on which color(s) are desired in the coating mixture. The user may also select the amount of each acrylic coating component to add to the gel-like base component, based on the amount of each color desired in the coating mixture. A user also has the option of mixing the gel-like base component and the acrylic coating component(s) around in the reservoir to form a desired pattern or a blended application, for example, by using a mixing tool 188.

The amounts of gel-like base component and acrylic coating component(s) that are dispensed into the reservoir are not particularly limited. Suitable amounts of gel-like base component and acrylic coating component(s) depend on the size of the reservoir (i.e., the total volume that can be contained inside the reservoir) and the size of the bead. According to particular embodiments, the amount of gel-like base component dispensed into the reservoir is sufficient to coat the exterior of a bead by rolling the bead in the reservoir. For example, the amount of gel-like base component dispensed into the reservoir may be between about 1 ml and about 7 ml, or between about 1 ml and about 5 ml, or between about 1 ml and about 3 ml. The acrylic coating component(s) may be added drop-wise to the gel-like base component in any amount that is preferred by the user. For example, one drop may comprise between about 0.01 ml and about 0.1 ml, or between about 0.03 ml and about 0.08 ml, or between about 0.04 ml and about 0.07 ml, or about 0.05 ml, of the acrylic coating component; and a user may add any amount of drops (e.g., between one drop and ten drops, or between one drop and five drops). The amount of acrylic coating component(s) added to the gel-like base component is dependent upon the amount and variety of color that the user wishes to add to the bead.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for forming a bead comprising:
   forming the bead between two bead-forming blocks; and
   applying a multi-component coating mixture to an outer surface of the bead, wherein the multi-component coating mixture comprises a gel-like base component and one or more acrylic coloring components,
     wherein the gel-like base component comprises an aqueous carrier, one or more water-swellable clay materials, optionally one or more preservatives, and optionally one or more additives, and
     wherein each acrylic coloring component is an acrylic paint.

2. The method of claim 1 further comprising mixing the gel-like base component and the one or more acrylic coloring components together to form the multi-component coating mixture.

3. The method of claim 1, wherein applying the multi-component coating mixture to the outer surface of the bead comprises rolling the outer surface of the bead in a reservoir of the multi-component coating mixture.

4. The method of claim 1, wherein the one or more water-swellable clay materials comprise synthetic layered hectorite magnesium lithium silicate.

5. The method of claim 1, wherein the gel-like base component comprises:
- the aqueous carrier in an amount between about 92.0 wt % and about 99.0 wt %,
- the one or more water-swellable clay materials in a total amount between about 1.0 wt % and about 4.0 wt %,
- optionally one or more preservatives in a total amount between 0 wt % and about 2.0 wt %, and
- optionally one or more additives in a total amount between 0 wt % and about 2.0 wt %.

* * * * *